US006760782B1

(12) United States Patent
Swales

(10) Patent No.: US 6,760,782 B1
(45) Date of Patent: *Jul. 6, 2004

(54) APPARATUS FOR CONTROLLING INTERNETWORK COMMUNICATIONS

(75) Inventor: Andrew G. Swales, Windham, NH (US)

(73) Assignee: Schneider Automation Inc., North Andover, MA (US)

(*) Notice: Subject to any disclaimer, the term of this patent is extended or adjusted under 35 U.S.C. 154(b) by 703 days.

This patent is subject to a terminal disclaimer.

(21) Appl. No.: 09/632,925

(22) Filed: Aug. 4, 2000

(51) Int. Cl.[7] .............................................. G06F 15/16
(52) U.S. Cl. ....................... 709/250; 709/249; 709/233; 709/218
(58) Field of Search ................................ 709/203, 218, 709/223, 224, 225, 229, 245, 250, 253, 249, 233

(56) References Cited

U.S. PATENT DOCUMENTS

| | | | | |
|---|---|---|---|---|
| 4,926,375 A | * | 5/1990 | Mercer et al. ............... | 709/201 |
| 5,163,046 A | | 11/1992 | Hahne et al. | |
| 5,285,449 A | * | 2/1994 | Georgiou ..................... | 370/360 |
| 5,475,601 A | | 12/1995 | Hwang | |
| 5,477,542 A | | 12/1995 | Takahara et al. | |
| 5,604,914 A | * | 2/1997 | Kabe .............................. | 710/1 |
| 5,664,101 A | | 9/1997 | Picache | |
| 5,668,951 A | | 9/1997 | Jain et al. | |
| 5,677,905 A | * | 10/1997 | Bigham et al. ......... | 370/395.21 |
| 5,687,286 A | * | 11/1997 | Bar-Yam ..................... | 704/232 |
| 5,740,075 A | * | 4/1998 | Bigham et al. ............. | 709/229 |
| 5,745,758 A | | 4/1998 | Shaw et al. | |
| 5,781,549 A | * | 7/1998 | Dai ............................. | 370/398 |
| 5,845,091 A | * | 12/1998 | Dunne et al. ................ | 709/240 |
| 5,864,679 A | | 1/1999 | Kanai et al. | |
| 5,893,091 A | | 4/1999 | Hunt et al. | |
| 5,970,069 A | * | 10/1999 | Kumar et al. ................ | 370/402 |
| 6,065,064 A | * | 5/2000 | Satoh et al. ................. | 709/249 |
| 6,122,281 A | * | 9/2000 | Donovan et al. ........... | 370/401 |
| 6,138,249 A | * | 10/2000 | Nolet ........................... | 714/25 |
| 6,151,625 A | * | 11/2000 | Swales et al. ............... | 709/218 |
| 6,205,147 B1 | * | 3/2001 | Mayo et al. ................. | 370/397 |
| 6,301,667 B1 | * | 10/2001 | Digiacomo et al. ......... | 713/201 |
| 6,370,587 B1 | * | 4/2002 | Hasegawa et al. .......... | 709/245 |
| 6,397,260 B1 | * | 5/2002 | Wils et al. ................... | 709/238 |
| 6,411,987 B1 | * | 6/2002 | Steger et al. ................ | 709/203 |
| 6,442,610 B1 | * | 8/2002 | Khanna et al. .............. | 709/227 |
| 6,484,061 B2 | * | 11/2002 | Papadopoulos et al. ....... | 700/83 |
| 6,505,247 B1 | * | 1/2003 | Steger et al. ................ | 709/224 |
| 6,577,638 B1 | * | 6/2003 | Tashiro et al. .............. | 370/401 |
| 6,587,884 B1 | * | 7/2003 | Papadopoulos et al. ..... | 709/230 |
| 6,598,077 B2 | * | 7/2003 | Primak et al. ............... | 709/219 |
| 6,625,662 B1 | * | 9/2003 | Satoh et al. ................. | 709/250 |
| 6,631,421 B1 | * | 10/2003 | Steele et al. ................. | 709/249 |

FOREIGN PATENT DOCUMENTS

EP           522590 A1 *   1/1993   ......... G05B/19/417

* cited by examiner

Primary Examiner—Jack B. Harvey
Assistant Examiner—Yemane Gerezgiher
(74) Attorney, Agent, or Firm—Larry I. Golden

(57) ABSTRACT

An interface allows for the transfer of real time control data with guaranteed delivery times between devices on a general purpose network and an industrial control system. A proxy server takes the role of a TCP/IP router and is configured to control the rate at which messages are forwarded from the non-real time to the real time portion of the network, keeping the loading of the real time portion stable regardless of the external non-real-time communication demand. Real time data is preconfigured and exchanged in a regular sequence, with the cyclic update period known. The length of any communication message necessary to transmit this information, plus any sequencing and acknowledgment overhead, is calculated in advance and aggregated. Each device with authority to transmit on the shared medium is given a time budget, calculated so that the total transmission quantity in unit time is deliberately limited to some fraction of the maximum transmission capability of the network. All communication from devices whose traffic loadings cannot be so controlled is arranged to pass through the proxy device in order to gain access to the deterministic network, and the proxy enforces the budget limits by introducing deliberate delays to the request messages if necessary.

11 Claims, 7 Drawing Sheets

APPARATUS FOR CONTROLLING INTERNETWORK COMMUNICATIONS

RELATED APPLICATIONS

This application is related to the following commonly assigned application, application Ser. No. 08/926,837, Applicants Docket No. SAA-2, as a continuation application.

TECHNICAL FIELD

Applicants' invention relates generally to the field of programmable controllers and more particularly to a system for the exchange of time—critical information between control devices coupled to an intranetwork such as would be common in the fields of factory automation and industrial process control.

BACKGROUND OF THE INVENTION

Real-time control requires a high degree of determinism over a general purpose network. Determinism is a measure of ensuring that a real-time event will be handled in a known period of time. Data flow load control approaches based on voluntary bandwidth allocation have been tried to increase the level of determinism. Typically a network is set up to budget a particular amount of transmission time per station per unit time, and as long as all stations abide by the restriction, predictability is achieved. Two factors impeded this goal, configuration complexity and the fact that secondary or occasional network participants are not bound by any agreements. Standard networks such as MAP have a long set of parameters which have to be allocated and agreed among the stations for interoperability to be achieved. In most cases, interoperability fails because of a mismatch of the parameters. A simple file transfer or database lookup by someone's portable computer could inadvertently disrupt the fragile assumptions about transmission bandwidth. Networks such as MAP handle this situation by not allowing laptop computers and other certain devices to connect to it to prevent any such problems. The use of communications techniques in automation products is typically stratified into at least 3 layers.

At the highest level are conventional data processing communication networks, designed to exchange information such as data files, electronic mail, and reports, and more recently to support widespread dissemination of information using the Internet and World Wide Web. Typical exchange of information is not repetitive, but it is transferred on demand and the level of loading of the network is unpredictable with varying delivery times. Examples of such networks are Ethernet, IBM Token Ring, Fiber Distributed Data Interface, the X.25 international packet switch network and many offerings from telephone companies such as Asynchronous Transfer Mode. General purpose network protocols using this hardware include the increasingly dominant TCP/IP, and Novell IPX, Digital Equipment's DECNET and others. The TCP/IP-Ethernet combination, in particular, is the most widely deployed computer network interface in use, and therefore has minimum cost to implement and support.

At the lowest level are specialized data moving buses, designed to allow a control device such as a computer or a Programmable Logic Controller to exchange information with its sensors and actuators. These buses are designed to carry the same information repetitively, and can therefore guarantee a maximum time between the value of the information changing, and recognition of the changed values by the partner devices. Examples of such technologies are remote I/O networks, Small Computer System Interface (SCSI), and various backplane bus extender techniques from many computer and automation vendors. Typically the messages carried are highly specialized and do not get copied directly onto the general purpose networks.

In a middle layer are a number of fieldbus solutions which accommodate supervision and updating of control devices. There are many approaches which compete with each other, and offer limited compatibility with each other. Examples include Siemens PROFIBUS, Schneider Automation's FIP and MODBUS PLUS., Allen Bradley's DEVICE NET, and Echelon Corp's LONWORKS. All of these network approaches require dedicated wiring and troubleshooting techniques but allow some mixing of control data exchange and equipment interrogation.

It would be desirable to develop an automation control system whereby these problems are minimized, using the same type of general purpose networks (Ethernet, Token Ring, ATM) at all three levels, allowing automation devices to use commercial network techniques, but still retain the security and performance characteristics of specialized industrial networks.

SUMMARY OF THE INVENTION

Accordingly, the principal object of the present invention is to provide an interface between an industrial control system and a general purpose network such as Ethernet.

Another object of the present invention is to provide an interface between the general purpose network and the industrial control system that will allow the transfer of real time control data with guaranteed delivery times.

A further objective of the invention is to provide an interface between the general purpose network and the industrial control system that will carry on-demand traffic from computer systems, operator terminals, and alarm systems.

In the preferred embodiment of the invention, the invention allows for control of a Programmable Logic Controller's (PLC) functions over a non-deterministic network connection. Although the network is not necessarily real time, a proxy server, which normally is used to provide a network firewall to solve security problems, provides a high degree of determinism. It does this by taking the role of a TCP/IP router and by a combination of routing, firewalling, and limiting the network throughput. It is configured as a communication interface between a real time and an non-real time portion of the complete system: It is installed outside of the network bridge and serves to restrict unnecessary traffic between the real and unreal time elements. It does this by controlling the rate at which messages are forwarded from the non-real time to the real time portion of the network, keeping the loading of the real time portion stable regardless of the external non-real-time communication demand. This allows the non-reel time network which is normally non-deterministic, to attain determinism by maintaining a desired level of probability for a successful message transmission in a fixed time period.

Real time data is preconfigured and exchanged in a regular sequence, such that for any item of information which is being repetitively updated, the cyclic update period is known. The length of any communication message necessary to transmit this information, plus any sequencing and acknowledgment overhead, is calculated in advance and aggregated. Each device with authority to transmit on the shared medium is given a budget consisting of a maximum transmission quantity in unit time, calculated so that the total transmission quantity in unit time is limited to some fraction of the maximum transmission capability of the network. In addition, the maximum length of an individual transmission is defined. All communication from devices whose traffic loadings cannot be so controlled is arranged to pass through a proxy device in order to gain access to the deterministic network, and that proxy enforces the budget limits by introducing deliberate delays to the request messages if necessary. The appropriate budget limits as percentages are dependent on the chosen network topology. A simple Ethernet can then be made equivalent to a dedicated fieldbus by exercising control over the loading of the network.

Other features and advantages of the invention, which are believed to be novel and non-obvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
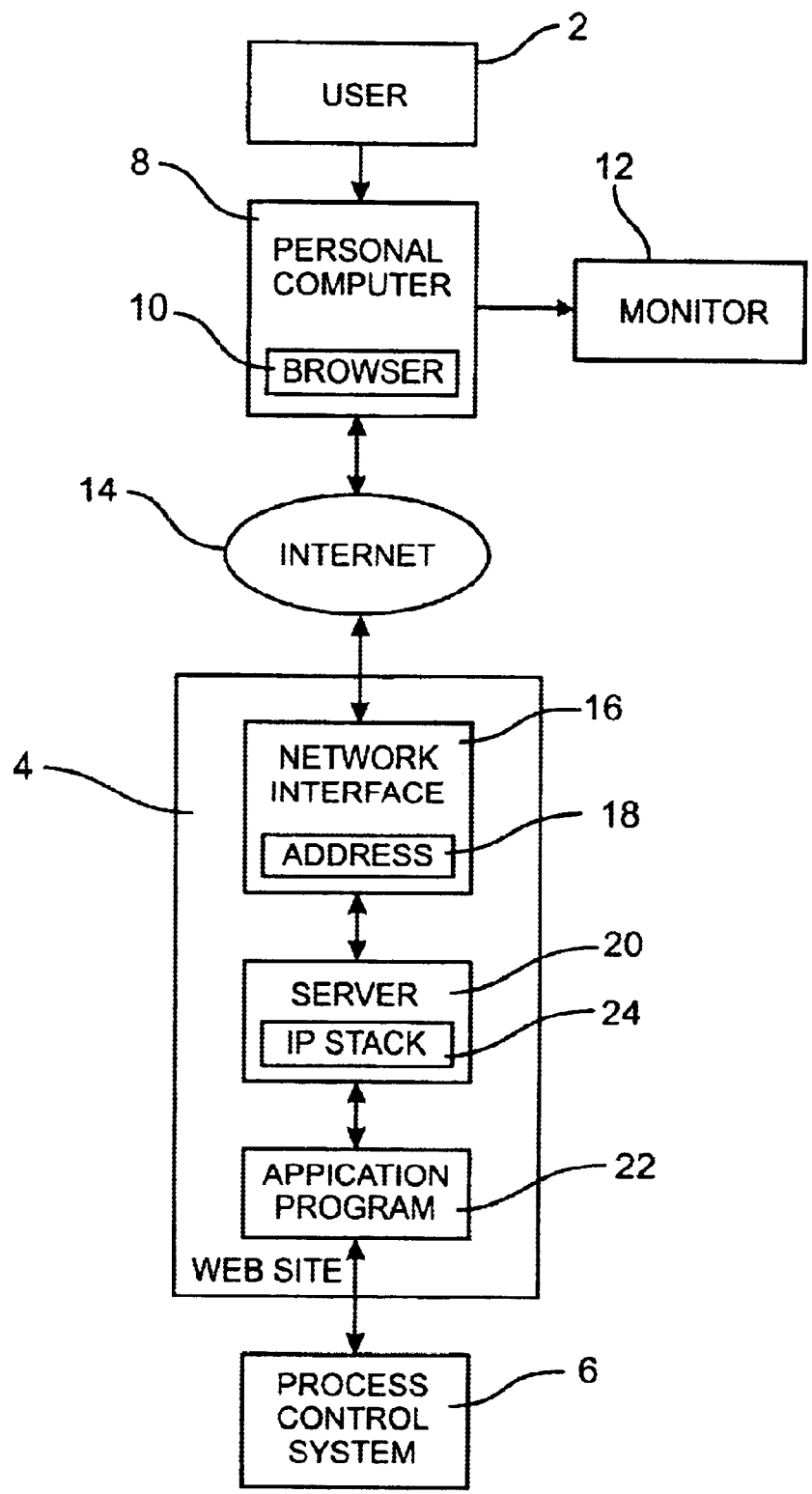
FIG. 1 shows an overview block diagram of a typical system illustrating the relationship between a user at a remote location and an Internet Web site used for monitoring a process control system according to the present invention.

FIG. 1 shows an overview block diagram of typical system illustrating the relationship between a user 2 at a remote location and an Internet web site 4 used for monitoring a process control system 6. The user 2 will have a personal computer (PC) 8 having a commercially available browser 10, such as Netscape Communication's Navigator or Microsoft's Internet Explorer, installed for viewing the contents at the website 4 by a monitor 12. The PC provides a remote human-machine interface (HMI) to the process control system 6. Various interconnection services are readily available to provide the physical and electrical interconnection from the PC to the Internet 14 itself. The Internet 14 is a collection of independent world wide communication networks that are interconnected to each other and function as a single connectionless entity. Communication is based on a client-server basis, using a number of established protocols that allow for communication and file transfers between the client and the server. The most widely used protocol is Internet Protocol (IP).

The web site 4 includes a network interface 16 having an unique Internet address 18, a server 20, and an application program 22. The server 20 acts as the HTTP interpreter which uses TCP in conjunction with IP, through TCP/IP stack 24 to interact with the network interface 16 and the application program 22. This enables the data transfer between the application program 22 and the user 2 through the Internet 14. The application program provides data from the process control system 6. This data can be used to monitor the control process by the user 2 at the remote location. The TCP/IP stack 24 enables data transfers over the Internet 14 between the user 2 and the web site 4 as required for the various layers specified by the IP protocol.

The user 2 can connect to the Internet 14 using one of a number of Internet service providers and will enter the address of the Web site 4 when connected. The Web site 4 will display a home page which may contain text, some type of multimedia offerings such as graphic images, video, or audio, and possible hypertext links to other documents. The browser 10 will allow the user 2 to read the page and interact with the choices associated with it. The browser 10 will send commands to the Web site 4 which will use the application program 22 to display whatever information is available from the process control system 6. The browser 10 functions as a remote human-machine interface or HMI control of the process control system as will be detailed below.

Figure 2:
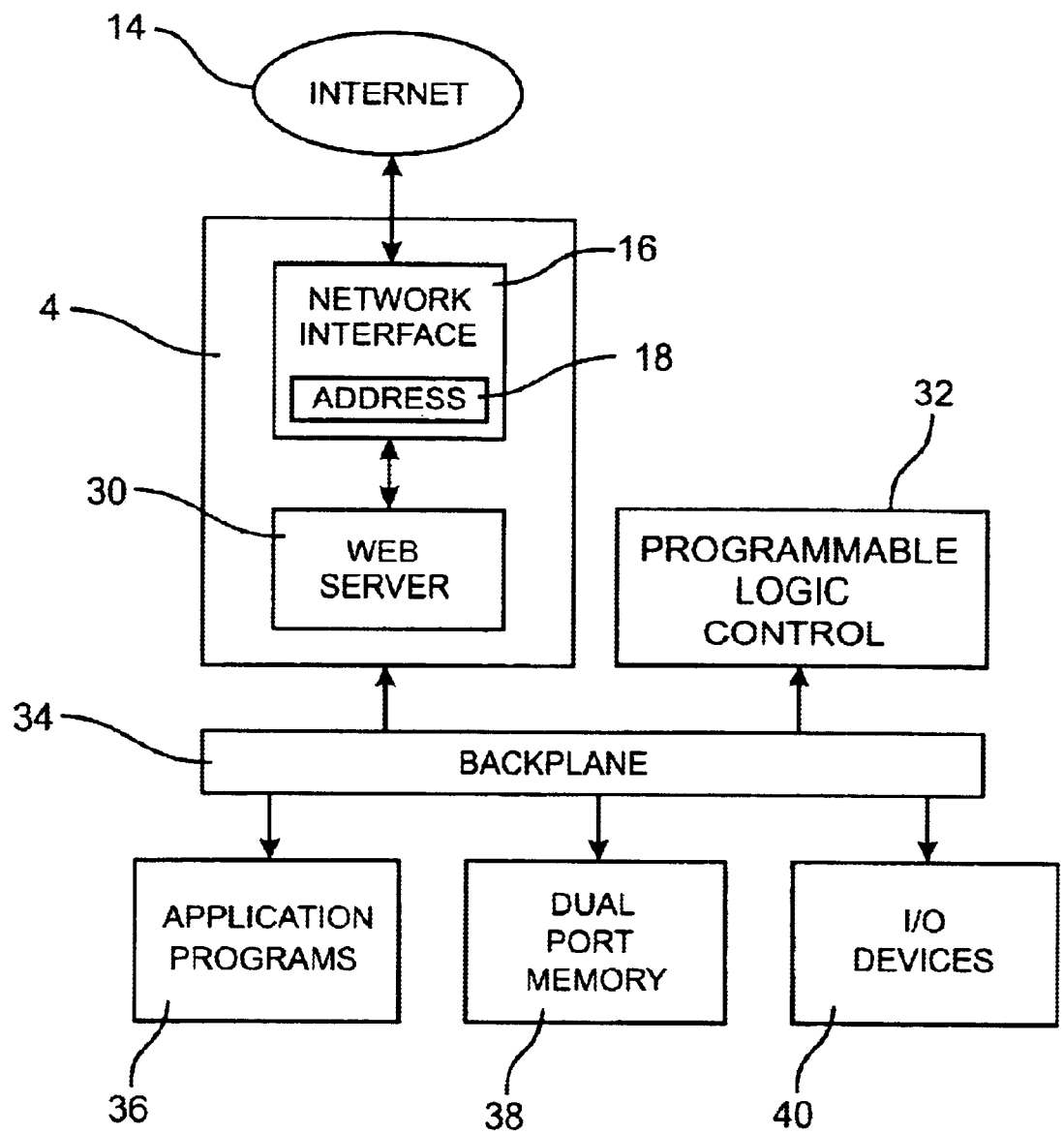
FIG. 2 is a basic block diagram of the present invention illustrating an Internet interface to a programmable logic controller system.

FIG. 2 shows a basic block diagram of the present invention illustrating the Internet interface to a programmable logic controller system. The web site 4 includes the network interface 16 having an unique Internet address 18 and a web server 30. The web server 30 provides the home page for the website. A firewall or security for the overall system can be included in the Web server 30, but is generally maintained as part of the network interface 16. In addition to providing security for various pages at the site, the user can disable the web server 30. A password and user list is provided in initial configuration files stored in the web server 30 that are downloaded from a remote server. Protection of the configuration file is then provided by the remote server and the web server 30 through the password and the user list. The web server 30 provides a direct connection for a programmable logic controller (PLC) 32 to the Internet 14 by plugging the web server 30 into its back plane 34. The web server 30 provides both a client and server interface. All signals between the PLC 32 and the web server 30 are through the back plane 34 rather than over a set of cables which would normally have to be coupled to input/output modules that are themselves plugged into the back plane 34. The back plane signals include addressing, control, data, and power. The client interface allows a user to send commands to a remote node over the Internet and the server interface allows for processing commands that originated from a remote node. Controlling the PLC 32 from a remote HMI, essentially on a real time basis is possible by controlling the data flow through the web server 30.

Associated with the PLC 32 are its application programs 36, dual port memory 38 and I/O devices 40. The application program includes 8 ladder logic program for controlling the I/O devices 40. The webs server 30 functions as a node on a TCP/IP network 42: allowing it to send commands to the PLC 32 and receive the response. Although the TCP/IP network 42 in the preferred embodiment is an Ethernet network, other high level protocols could be used. Using a web browser at a remote location through the Internet 14, a user can control and view configuration information of the PLC 32.

Figure 3:
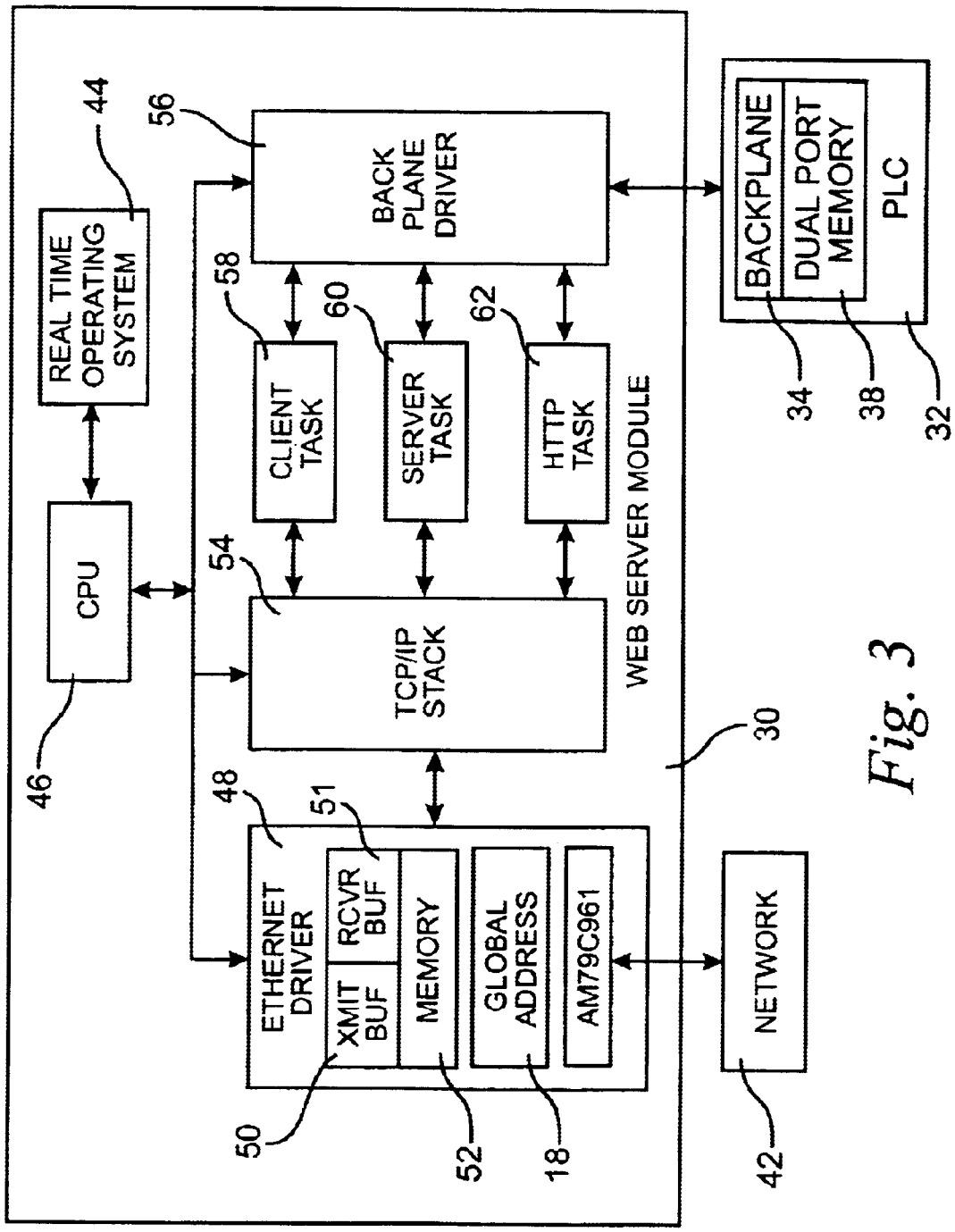
FIG. 3 is a block diagram of the Web server modules illustrated in FIG. 2 according to the present invention.

The web server 30 is shown in greater detail in FIG. 3. Various components provide the required connectivity to perform its functionality. A real time operating system 44 controls the interaction between the components. The operating system 44 allocates central processor (CPU) 46 to various tasks, provides memory management, and provides a set of message services and signal services. The message and signal services allow for communication between tasks, and between drivers and a task. Connection to the TCP/IP network 42 Is through an Ethernet driver 48 which transmits and receives messages over Ethernet via an Ethernet communication chip such as an AM79C961. The web server will have an unique global address 18, allowing it to be addressed by other devices on the network. Communication can be over a fiber optic cable or a twisted wire pair. The Ethernet driver 48 manages transmit 50 and receive 51 buffers in memory 52, and interfaces with the AM79C961Ethernet chip. The transmit 50 and receive 51 buffers are shared both by the AM79C961and the Ethernet driver 48. The Ethernet driver 48 also provides a transmit request interface, and a receive indication interface to a TCP/IP stack 54. The AM79C961provides a transmit queue interface, a receive queue interface, and generates interrupts on completion of transmitting a message, and on receiving a new message. The Ethernet driver 46 places receive buffers In the receive queue. In the interrupt routine, the Ethernet driver 46 examines the receive queue. If any messages are in the receive queue, it passes the receive buffer to the TCP/IP stack 54. The TCP/IP stack 54 copies the buffer, and sometime later calls the Ethernet driver 48 to return the buffer and place the returned buffer back into the receive queue.

The TCP/IP stack 54 calls the Ethernet driver 48 to transmit a message. The Ethernet driver 46 attempts to allocate a buffer from the shared memory 52. If it succeeds, it copies the message into the buffer, and places the buffer into the AM79C961transmit queue. If there is no transmit buffer, then the driver drops the transmit message. In the interrupt routine, the Ethernet driver 48 examines the transmit queue, and frees the transmitted buffers.

The TCP/IP network 42 allows special MSTR (master) functions that allow nodes on the network to initiate message transactions. These MSTR functions include reading and writing data and are used for commands and responses. They allow programs running in the PLC 32 to send commands to a remote node on the TCP/IP network 42 and receive the responses A back plane driver 56 sends commands and receives the response to the PLC 32 over the back plane 34.

The back plane driver 56 receives request from the PLC's ladder logic MSTR blocks, stored in its memory 38. When a response is available, the back plane driver 56 passes it back to the MSTR block. The back plane driver 56 provides a server 58 and client 60 interface to applications. The server 58 interface allows an application to issue a request command to the PLC's 32 executive program, and receive its response. The client 60 interface allows an application to receive a new MSTR request, and pass back the response to the ladder logic program.

The server 58 interface uses a queuing mechanism and call back functions. An application queues both the request and the call back function associated with the request. When the back plane driver 56 services the request in its interrupt routine, it calls the associated call back function. The response and the original request is passed to the call back function. The call back function can call an operating routine to either pass a message or signal the application.

The client 60 interface also uses queues and call back functions. The client application queues both an indication request on queue and a call back function associated with the request. When the back plane driver 56 detects a new MSTR block request in its interrupt routine, it calls the associated call back function. The request is passed Into the call back function. The call back function can call an operating system routine to either pass a message or signal the application. If the back plane driver 56 detects that the MSTR block has been aborted, or is no longer being solved, it calls a user supplied associated abort call back function. The application calls a routine to pass the MSTR response and an associated call back routine to the driver. Sometime later, the driver passes back the response to the ladder logic program in its interrupt service routine, and then calls the user supplied call back function.

The PLC 32 interfaces with the web server 30 hardware via the dual port memory 38. It reads and writes to the dual port memory 38 using an ASIC chip. Writing to a specified location-will cause an interrupt. The PLC 32 first writes a message in the dual port memory 38, and then causes an interrupt. The message indicates a type of command. One type indicates that a MSTR block is being solved. Other types are used for passing requests to the PLC 32, and obtaining the responses to the requests. After the PLC 32 passes the message, it polls the dual port memory 38 for commands placed by the back plane driver 56. These commands are read memory, write memory, and processing is complete. The back plane driver 56 uses state machines to process the MSTR interrupts. The maximum number of active MSTR blocks Is set at four in the present invention, requiring four state machines. When the back plane driver 56 receives an MSTR interrupt, it attempts to find an associated state machine that matches with the MSTR block. If there are already four outstanding transactions, no more are available, and the back plane driver 56 will set the MSTR's outputs to false. If a state machine is found, the back plane driver 56 determines if it is a new transaction, an outstanding transaction, or a response is available. If it is a new transaction it copies the request, and calls the application's associated call back routine. If its an outstanding transaction, it indicates to the ladder logic program-that the MSTR block is still busy. If a response is available, the back plane driver 56 copies the response, sets either the MSTR's completion or error output, and calls the application's call back routine.

Two interrupts are used for processing a request. On the first interrupt, called the report interrupt, the back plane driver 56 copies the request into a data structure located in the PLC's 32 dual memory 38. On the second interrupt, called the end of scan interrupt, the back plane driver 56 copies the response from the controller's data structure into the user's buffer. It then calls the user's associated call back function.

The request for accessing the PLC's 32 registers is processed by the back plane driver 56, and is not sent to the PLC's executive program for processing. The back plane driver 56 determines the memory location in the memory 38 of the registers the PLC 32. At an end of scan interrupt, the back plane driver 56 processes the read/write register requests by sending commands via the dual port memory 38 to the PLC 32 to read or write the locations containing the registers. The back plane driver 56 will service a maximum of four read/write register requests at the end of a scan interrupt.

A client task 58 interfaces with the TCP/IP stack 54, the back plane driver 56, and uses the operating system 44 message services. It processes the MSTR request. When the client task 58 receives a MSTR request from the back plane driver 56, it passes the request to the TCP/IP stack 54. When the TCP/IP stack 54 returns a response to the client task 58, it passes the response to the back plane driver 56. The TCP/IP stack 54 provides a Berkeley TCP/IP interface and a signal extension. The signal extension calls a user supplied function which passes in a socket number, a task ID, and an event. The signal function calls the operating system 44 to send a message to the task indicated by the task ID. It sends a message either to the client 58 or server 60 task. The client task 58 posts request indications to the back plane driver 56, and the associated call back routine calls the operating system 44 to send a message to the client task 58 for a new MSTR transaction.

The client task 58 manages multiple outstanding MSTR transactions using the state machines. There is a linked list of connection state machines. The connection state machines are used for establishing connection and closing connections, In addition each connection state machine contains a list of transaction state machines. Each transaction machine on the connection state machine represents a transaction to a node represented by the connection machine. The transaction machines are used to send a request, and process the response. The client task 58 enters a loop after performing initialization.

It calls the operating system 44 to receive a message. The operating system will block the client task 58 until there is a message or until there is a time out. It either receives a message from the TCP/IP stack 54, from a MSTR call back routine, or it times out. It processes the message or the time out and then reenters the loop. If the message received from the operating system 44 is a new MSTR request, the client task will obtain a connection state machine, and places a new transaction machine at end of the list of the connection state machine's list. At this point the transaction machine will attempt to transmit the message. It may not be possible to transmit the message because no connection has been established, or because the remote side may have applied flow control.

If the message received from the operating system 44 is a TCP/IP event, the client task 58 finds the associated connection machine and determines if the TCP/IP event is an accepted connection, an aborted connection, or a received data event. Based on the connection state, and the transaction machine's state, the client task 58 processes the message to advance the transactions if there are any. Receiving data for the MSTR responses may occur over several TCP/IP events, and the transaction state machine assembles the data into a response.

When the client task 58 requests the TCP/IP stack to transmit a message, not all of the message may be transmitted. This occurs when the remote node is flow controlled, which is explained below. If the call to the operating system 44 to receive a message returns with a time out, or if there is a message, the client task 58 searches the list of connection machines that are flowed controlled. For each flow controlled connection, it tries to advance the transaction state machines on the connection state machine list that are flow controlled.

The server task 60 processes a request originating from the user at the remote location. The server task 60 interfaces with the back plane driver 56, the TCP/IP stack 54, and the operating system's 44 message services. The server task 60 posts requests to the back plane driver 56, and an associated call back routine uses the operating system 44 message services to send the response to the server task 60. A TCP/IP stack 54 signal function also uses the operating system's 44 send service to send an TCP/IP event to the server task 60. The server task 60 can handle multiple transactions and connections. Like the client task 58, it maintains a list of connection machines, and each connection machine contains a list of transaction machines. The connection machines are for managing the connection and the transaction machines manage the incoming requests and responses.

The server task 60 enters a loop after performing initialization. It calls the operating systems 44 to receive a message. The operating systems 44 blocks the server task 60 until there is a message or until it times out. It either receives a message from the TCP/IP task's 54 signal handler, from the back plane driver 56 or it times out. It processes the message or the time and reenters the loop. If the message received from the operating systems 44 is from the TCP/IP task's 54 signal handler, the server task 60 determines if the event is a connection request, a close socket event, or a receive data event. Based on the TCP/IP event, the server task 60 uses the connection machine and transaction machine to advance the transaction. Received data for a request may occur over several receive data events, and the transaction machine assembles the events into a request message. When the response message is received from the operating system 44, the server task 60 finds the connection and transaction machine in order to send the response.

When the server task 60 requests the TCP/IP stack 54 to transmit a message, not all of the message may be transmitted. This occurs when the remote node is flow controlled. If the call to the operating system 44 is to receive a message returns with a time out, or if there is a message, the server task 54 searches the list of connection machines that are flowed controlled. For each flow controlled connection, it tries to advance the transaction state machines on the connection state machine list that are flow controlled.

After the server task 60 has parsed the header of an incoming request, it attempts to allocate a structure to pass the request to the back plane driver 56. If the server task is already processing a predetermined number of outstanding requests, the attempt fails, the connection is placed into a blocked state, and the body of the request Is not read from the TCP/IP stack 54. As a result the TCP/IP stack may apply flow control to the remote node. When one of the other requests is complete, the free data structure event causes a blocked connection machine to continue processing the incoming Modbus request.

The HTTP task 62 interfaces with the TCP/IP stack 54, and the back plane driver 56. The HTTP server task 62 receives a HTTP request from the TCP/IP stack 54. To process the request, it may access the PLC 32 through the back plane driver 56 and back plane 34. The HTTP server task 62 sends back the response over the TCP/IP stack 54. The framework is supplied by the operating system 44. The framework creates the HTTP task, accepts connection, and parses the HTTP request. After parsing the request, it calls the operating system 44 to process the request. Processing the request involves determining the request type and processing the actual request. The different request types allow a user to acquire a snapshot of the PLC 32 operations by allowing a view of various registers within the PLC 32 and dual memory 38. These request types also include display of the PLC 32 configuration, remote and distributed I/O and module health statistics, display registers, back plane configuration, Ethernet statistics and others as shown in Table 1:

TABLE 1

Show the home page
Show the programmable logic controller's configuration
Show the Ethernet statistics
Show the read register request page
Show the 4x registers
Show the racks attached to the controllers back plane
Send an image. The different images are gif files that are displayed on the various pages
Show the remote I/O statistics
Show the list of configured remote I/O drops
Show a remote I/O rack's configuration and health
Show a remote I/O drop's communication statistics
Show the I/O reference values of a remote I/O module
Show a list of configured distributed I/O nodes
Show the configuration and the health of a distributed I/O node
Show the I/O reference values of a distributed I/O module The home page contains hyperlinks to seven pages of data. The configuration page will display the configuration of PLC 32. The remote I/O and distributed I/O module health status pages are a series of linked pages. The first page displays the communication health statistics at the Remote I/O and Distributed I/O head and contains a link to a configured drop page. The configured drop page displays a table containing drop numbers which are linked to a drop status page and rack numbers which are linked to the drop and rack configuration pages. Two tables are included in the drop status page, one for showing the communication status of the drop and the other for showing which racks are populated with the I/O modules. The drop and rack configuration page displays the I/O modules, their health, and slot location for the given rack. From a selected module, a user can view its input and output values. Register data is displayed in a template having a form and a table, with the user entering an address and a length. The table will display the registers values. A table showing option modules and their slot location is displayed on the back plane configuration page. The data appearing on the pages is static but can be automatically updated at preselected times.

The operating system 44 processes these requests and responds by sending HTTP messages through the TCP/IP stack 54. Processing some of these requests involves reading the PLC's traffic cop, registers, coils, or various page zero locations where statistics are kept. To perform these reads, the operating system 44 sends a request to the back plane driver 56 and uses an event signal mechanism and event flags to determine when the request is complete. After sending the request to the back plane driver 56, the operating system 44 waits for an event flag to be sent. When the back plane driver completes the request, the back plane driver 56 calls a call back routine, which sets the event. The operating system 44 then resumes processing the request.

While the specific embodiments have been illustrated and described, numerous modifications are possible without departing from the scope or spirit of the invention. The present invention allows a user to monitor and control PLC's and other automation equipment from any modrem web browser anywhere on the Internet.

Figure 4:
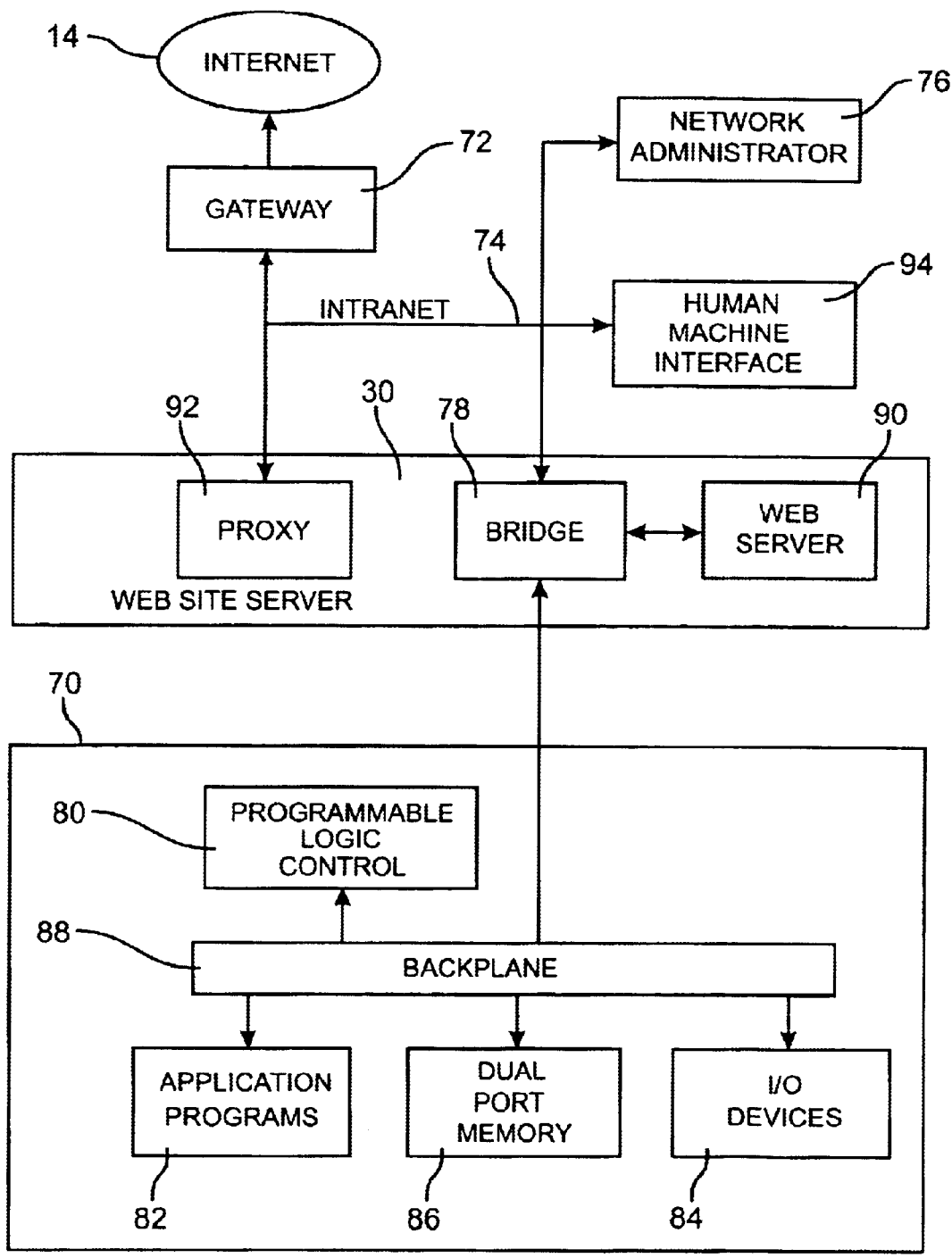
FIG. 4 is a basic block diagram of the present Invention illustrating an Internet interface to an intranetwork including a bridge to a programmable controller system.

FIG. 4 illustrates a basic system utilizing the present invention to interface a programmable logic controller system 70 to the Internet 14 through a gateway 72. The gateway 72 contains a firewall to provide the necessary security and couples the PLC system 70 through an intranetwork 74 controlled by a network administrator 76. Although in the preferred embodiment, the intranetwork 74 is a TCP/IP network such as Ethernet, other protocols are possible and the protocol used is not a restriction. The PLC system 70 includes a bridge 78 for coupling a programmable logic controller 80 to the intranet 74. PLC 80 runs application programs 82 for controlling input and output devices 84. A memory 86 stores the application programs and provides storage locations and registers for various statistics of the PLC system 70. These may include the PLC's configuration, I/O rack's configuration and health, the racks attached to the PLC 80 back plane 88, and other pertinent information. The web server 30 previously described Includes the functionalities of the bridge 78, a web site server 90, and a proxy 92 and is plugged into the backplane 88 of the PLC 80. The proxy 92 is a specialpurpose application similar in design to the Internet standard SOCKS proxy. It listens for connections to the gateway, and when a connection is established, the first record of data expected is a target designation which specifies the address of the web site server 90. The proxy 92 will open the requested connection, and all subsequent requests and responses will be forwarded to the web site server 90. Any detected errors will result in the inbound and outbound connections being closed.

Proxy 92 is general-purpose. It can be either hardware or software based. It has no knowledge of the identity of the selectable web site. It functions as a TCP/IP router and is configured to be required in any communication between the real time portion, i.e., the PLC system 70 and non-real time, i.e., the Internet 14 and intranet 74 portions of the overall system. It is specifically installed outside of the bridge 78 and the firewall of the gateway 72. Its primary function is to provide data flow control by restricting unnecessary communication traffic from the real time portion by controlling the rate at which messages are forwarded from the non-real time to the real time portions. This keeps the network loading of the real time portion stable regardless of the external network communication demand, giving the external networks, which are non-deterministic, a predetermined level of determinism and probability of successful message transmissions during a fixed time period.

A human machine interface (HMI) 94 may be coupled to network 74. It is used to program and monitor PLC 80 and provide graphical representations of the complete PLC system 70, showing Its present status and operating conditions. Various icons representing input and output devices can be included that actually provide control functions in the graphical representations. It can also be used to design linked pages to the home page of the web site. These pages mimic the graphical representations and become accessible to a user at the remote location. The icons can be linked to mini-application programs called applets. The user at the remote location can-then have access to the functionality of the HMI 94 over the Internet 14 since a web browser, such as Navigator or Explorer can interpret and run applets through the browser.

Figure 5:
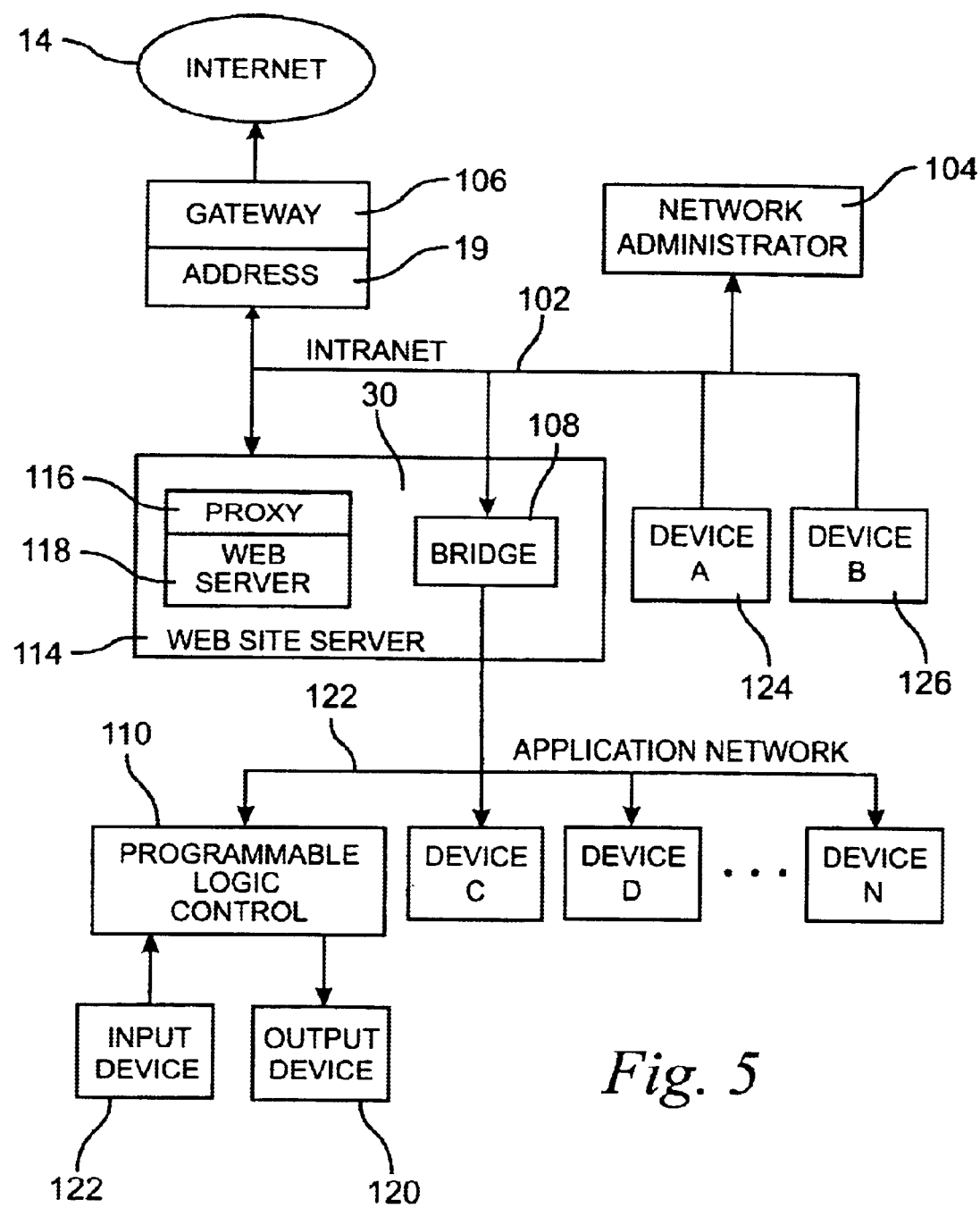
FIG. 5 is a basic block diagram of the present invention illustrating an Internet interface to an intranetwork including a bridge to a network of programmable controller systems.

FIG. 5 is a block diagram of the present, Invention illustrating a method of providing a level of determinism to a non-deterministic network. The Internet 14 is coupled to an Ethernet intranetwork 102 controlled by a network administrator 104 by gateway 106. Gateway 106 contains the Internet global address 18 of the web site and firewall to provide the necessary security. A bridge 108 provides access to a network 112 of devices including a programmable logic controller system 110. An application protocol, such as MODBUS, is used on network 112 which is part of the backplane of PLC system 110. Web site server 114 includes the bridge 108 and proxy 116, according to the present invention and as previously described. PLC 110 is used to control output devices 120 based on internal application programs in response to internal programming commands, status of input devices 122, and commands received from the Internet 14, intranet 102 or application network 112.

The proxy 116 listens for connections to the gateway 106 and when a connection is established, the proxy 106 will open the requested connection. The first record of data expected is a target designation in the form: 'target.anywhere.com 502' where 'target.anywhere.com' is a DNS address of PLC 110 or of devices c through n on network 112 and 502 is the address of a MODBUS reserved port. It is thus possible to equip a whole factory or even a whole company with direct Web service to its control devices, allowing monitoring and control from the factory floor or office, from customer sites, from home, or from anywhere with Internet access.

Network 112 provides a mechanism for exchanging real time data between the different systems. It uses two transaction types to achieve 99% of all data exchange. These transactions are to read registers, which are requests for the current values of one or more data items up to a total of 125 words (250 bytes) from a target device, and to write registers which are requests to update one or more data items up to a total of 100 words (200 bytes) in a target device.

Data flow control in the present invention ensures that a real-time control event is processed within a known period of time. The Internet 14 and intranet 102 can be predictable in terms of a guaranteed maximum time for transmission of information from one point to another by controlling the load factor, or bandwidth utilization. These networks are characterized by a 10 Base T universal interface and a 10M bits per second (Mbps) bandwidth and are designed to automatically slow down traffic when collisions are encountered, indicating that the load factor may be too high. Theoretical calculations and pilot network measurements indicate that by deliberately reducing the load factor of a shared network to about 10%, and by keeping the rate of non-repetitive traffic small compared to the repetitive traffic, the predictability characteristics of the general-purpose network become similar to those of a more purpose-designed network. In addition, the figure of 10% applies only when a repeating hub is used to connect the devices. If the hub is replaced by an Ethernet Switch which allows full access to the 10 Mbps bandwidth of the network, the load factor can be increased to about 30% with the same deterministic characteristics. When using a switch, the exponential backoff algorithm of Ethernet never becomes a factor, and the behavior of the network is governed by simple queuing theory, as in the more purpose-designed networks. As an example, a simple master-slave network with 1 master and 5 slaves, and with the master exchanging 40 bytes of data with each slave per scan, the actual repetitive traffic load per scan will be:

10 messages @ (80 bytes overhead+40 bytes data) @ 0.8 usec per byte=960 usec

A nominal scan time of 9.6 milliseconds would be equivalent to a 10% load factor, and the chance of a message being delayed more than the 9.6 milliseconds due to collision backoff is about 1 in 1 Million. The 10% load factor assumes all stations compete directly for transmission.

In the present invention, the addition of the network bridge 108 between the real time network 110 and the general purpose network 102 is all that is required. The control devices' functionality can be well defined by using a master-slave poll sequence instead of a transmission on demand. The bandwidth goal is maintained behind the bridge by adjustment of poll loop repetition rates. If device A 124 and device B 126 on the intranetwork 102 were to generate a lot of traffic, for example by starting some sort of file transfer, proxy 116 prevents that traffic from interfering with the control subnet. On the other hand, if device A 124 wanted to interrogate PLC 110 to exchange process data, the traffic would be forwarded through bridge 108. It is only necessary to take more sophisticated steps if untrusted devices, such as personal laptop computers, are allowed on the same physical subnet. More restrictive network security rules could be enforced than normally would be used by the control devices by hiding certain devices such that data can only be read by other trusted devices. The problem of uncontrolled use of network bandwidth is related to that of security. If a device is making a request which has not been anticipated; it delays or disrupts the time-critical traffic.

The present invention implements flow control by using TCP and proxies with private networks. This assists with security as well as load control. Internet addresses are typically allocated as groups of around 250 addresses, known as a Class C subnet. An installation with a thousand or so computers on the Internet 14 might have 4 or 5 such Class C subnets. Such a subnet has nothing to do with physical subnets, separated by network bridges. It is purely a logical addressing convention, enforced by the operating software of the units. By the design of a TCP/IP network, a computer on one such subnet cannot talk to a computer on another such subnet except via a router. This restriction applies even if the devices are on the same physical cable. Thus device A 124 cannot talk directly to PLC 110 and requires proxy 116 to serve as the router. Messages between the two devices result in a duplication of the messages since the proxy 116 has to repeat the received message and resend it to PLC 110. Network 110 is a private IP subnet with PLC 10 and devices c through n. Communication between the devices on network 110 is direct and can proceed without interference but any exchange with another party outside the network must involve communication with the proxy 116. The proxy 116 has the ability to slow down any traffic which needs to enter the subnet to enforce the network loading rules. More importantly, it controls all non-repetitive traffic, since MODBUS messages are inherently half-duplex, and the next request on a channel cannot be sent until the response to the previous one is received.

An even higher level of security is obtained by using the proxy 116 to communicate between the IP subnets. A proxy is a device which carries on a conversation with an initiator on behalf of a target. Originally, the concept of a proxy was developed as a response to the increasing use of firewalls in connection of devices to the Internet. When communicating via a proxy, the initiator establishes the connection using only its knowledge of the proxy's address. Once the, connection is established, the initiator may advise the proxy, of the identity of the target or it might be implied by the TCP port used when connecting. The proxy then establishes a connection to the real target, and volunteers to forward any TCP data from one connection to the other as needed. The end result is that the initiator is communicating to the target, but every message involves two transmissions, first from the initiator to the proxy and second from the proxy to the target.

The proxy 116 can be a physical machine or it can simply be a small software program running on one of the computers attached at an appropriate point on the network, and using the networking services of the operating system concerned. In the present case, the proxy 116 is part of the Web server 114. In the preferred embodiment, the proxy is a program written in the JAVA™ programming language of about 200 lines of code in size. Using well known master-slave techniques, it determines a maximum scan rate based on the number of devices coupled to the network. Using a 10% load as a rule of thumb and the fact that each transaction generates approximately 100 microseconds of traffic, a 1 millisecond per slave device can be used to calculate a desired scan rate.

The maximum size of an individual message is limited to approximately 250 bytes. When the overhead of an Ethernet/TCP header is added, the result is still limited to about 330 bytes- On the 10 Mbps Ethernet, such a message has a transmission time of 270 usec. This means that it is possible to reduce the impact of unsolicited traffic on the I/O scan to less than 500 usec by the simple expedient of throttling the rate at which such requests are accepted. The proxy 116 and bridge 108 mechanisms will do just that. They are almost always stateless: If a message needs to be repeated for any reason, the response may be generated from scratch with no loss of functionality. This in turn reduces, the need for buffer memory space and Improves the latency of data being transmitted. In particular, it makes possible a slave engine which requires very little CPU resources yet can achieve response times in the submillisecond range.

In the present invention, it is possible to accommodate a mix of permanent and occasional participants on the subnet, such as when connecting a local programming device to the network or when using a laptop to get one's e-mail from the plant floor, without compromising the determinism of the real time data. The users of such devices will see communication being a little slower than on a network to which they had unrestricted access.

Figure 6:
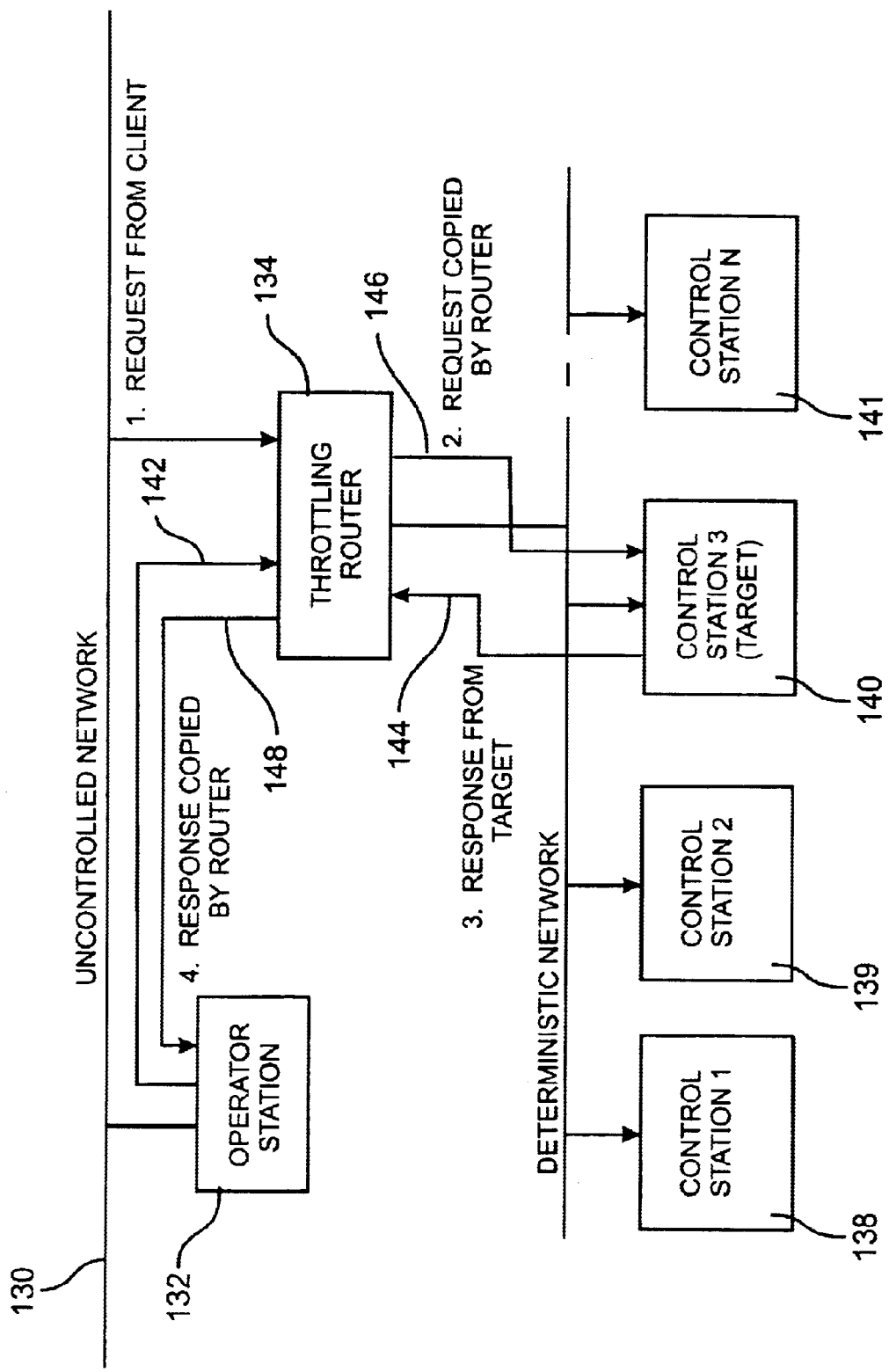
FIG. 6 is a flow chart of a sequence of steps utilized in a proxy device according to the present invention.
Figure 7:
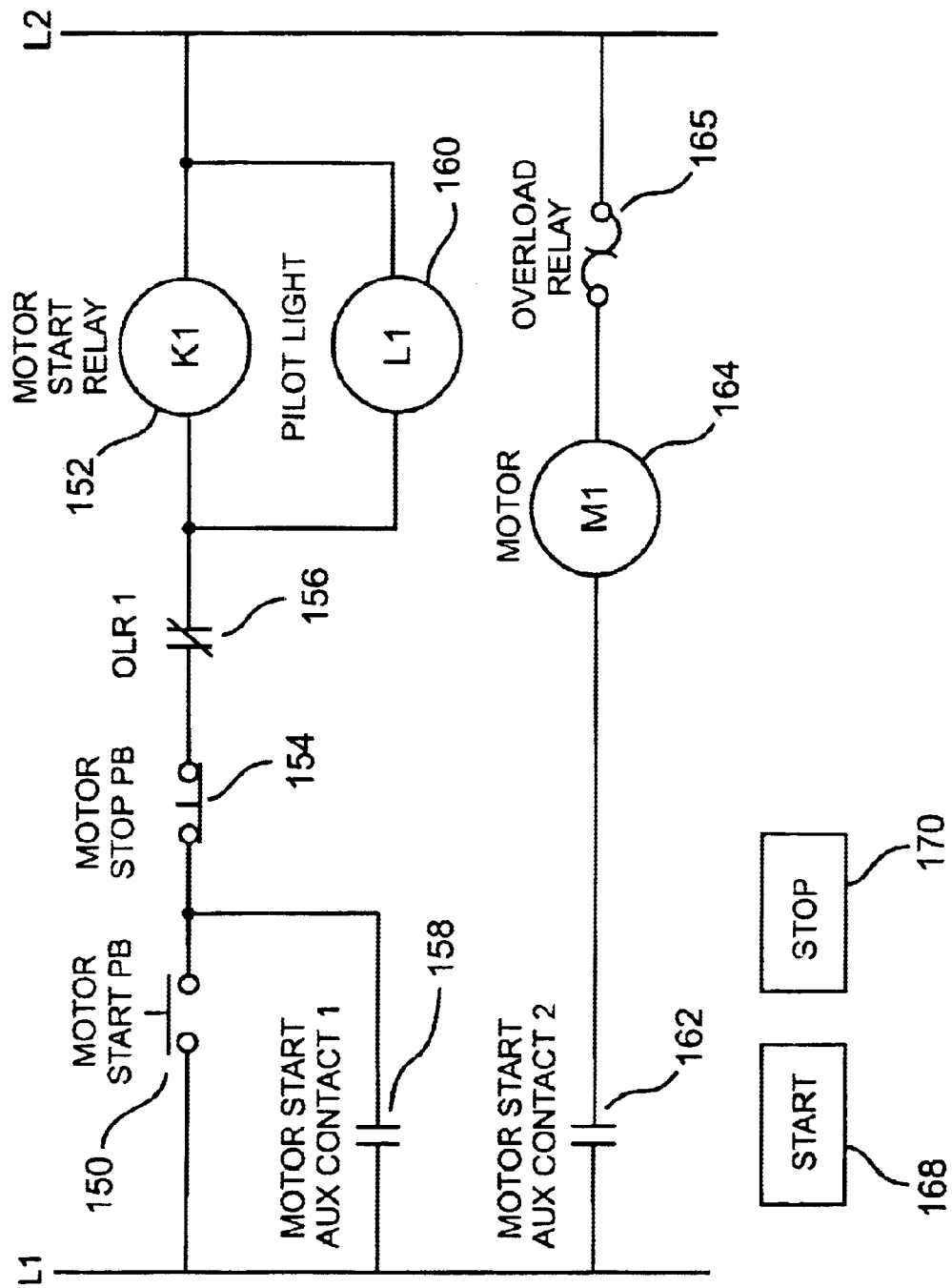
FIG. 7 is a typical mimic page available to a user at a remote location utilizing a browser which illustrates the present invention for controlling a programmable controller system.

FIG. 6 is a sequence of steps utilizing a proxy device according to the present invention. If the control devices are preconfigured to use not more than 7% of the available transmission capacity for their regular traffic, the number of participants can be calculated. In the case of 10 Mbps Ethernet, if each transmission involves 120 microseconds, and the maximum time critical cycle time is 10 milliseconds, the possible number of participants is: 10000×7% /120= approximately 6. Therefore six control devices could share the dedicated subnet, exchanging information between them at a 10 millisecond period, and during that time the loading due to the control devices themselves will be 7.2% max.

If an interrogation message 142 comes from an operator terminal station 132 on an outside uncontrolled network 130 having no load limitations, it must first pass through a throttling router 134 or proxy in order to gain access to control stations 138–141 on a subnet 136 which is a deterministic network. The proxy 134 is set to control its contribution to the loading of the subnet to 3%. If the amount of traffic involved in the request is approximately 120 microseconds, the proxy, 134 can police the budget by maintaining a minimum spacing between such requests of 120×100% /3%=4000 microseconds. The proxy 134 will allow at most one such request to enter the network every 4 milliseconds. This is regardless of the number of such requests which might be initiated concurrently by multiple stations on the external network 130.

After a time delay, if any, has expired, the proxy 134 will forward the message 146 to its intended target 140. The target 140 is unaware that the request message 142 has been intercepted and regenerated by the proxy 134, since that is a normal characteristic of the network type concerned.

The target 140 generates its response 144, which is shipped back to the proxy 134. The proxy 134 regenerates the message 148 and completes the transaction by sending it back to the operator station 132. From the perspective of the operator station 132, it appears as if the target 140 had a response time somewhat larger than the true response time, but it is consistent with having a response in less than 200 milliseconds typical of uncontrolled networks.

Random traffic effects the determinism of the exchange of control data between the stations 138–141. Since the base loading due to the control traffic is at most 7.2%, and the random traffic from the proxy at most an additional 3%, the aggregate load on the network 136 is less than 10.2% for the unit time of 10 milliseconds. This loading level on Ethernet will result in a probability of delivery delays exceeding the unit time due to collisions which is comparable to the loss of messages due to noise which is about 1 in 1 million.

There is no need for the operator station 132 to use specialized communication hardware or software to achieve this result, since the delays if any are being imposed on the transaction sequence without its knowledge. The most common automation device interrogation protocol, known as MODBUS, has an appropriate request-response characteristic to take advantage of these techniques, as well as a self-imposed limit on message length which further reduces predictability impact. The standard transport protocol TCP, part of the suite TCP/IP also encourages such request-response behavior by allowing choice of a configuration parameter known as the transmission window. The proxy device 134 will enforce traffic control even of a file transfer nature which would naturally, attempt to flood the network with messages, by controlling the reported transmission window as seen by both participants in a connection. This allows activities such as file transfers, Web browsing, and real time control to share a deterministic Ethernet, so long as all such traffic were coerced to use the proxy.

In the case of a switched network, such as full duplex Ethernet or ATM, the aggregate budget limit can be set to a fairly high percentage, such as 70% of nominal transmission capacity. This is because the worst case delay for submitting a message for delivery on the contested medium is the simple sum of the lengths in terms of time of the outstanding messages from all competing stations. In turn, since those are less than 100% of capacity in a given unit time interval, there will be an opportunity for the message in question to be delivered in that unit time interval.

In the case of a collision-based network, such as shared Ethernet or various multidrop networks involving shared cable and a Jul. 11, 2000 carrier signal, a lower percentage figure is used, to allow for the finite probability that a message will collide with one sent bar a peer: It—will be necessary to off and retry the message, however. Theoretical calculations and practical studies indicate that the appropriate level for a simple shared Ethernet network is about 10%. At this level, the chance of a message being delayed more than the budgeted unit time interval or cycle time is equivalent to the chance of the message being lost due to electrical noise on the network.

The performance of an Ethernet network can be improved by progressively replacing repeating Ethernet Hubs, which are required for coupling any device to it, with Ethernet Switches as part of the wiring infrastructure. Even more improvement can be obtained by selectively upgrading the speed of the interfaces at those devices carrying most traffic, an option not available in most fieldbus technologies.

A mimic page which represents some of the hardware physically connected to a programmable logic controller system can be constructed utilizing various graphical programs readily available and that are not an object of the present invention. The present invention allows a user at a remote location, using a browser, to view the mimic page and actually control various components illustrated in the mimic page. FIG. 4 shows a simple motor start-stop control in ladder logic diagram form that could be available as a mimic page to the user. Pushing a motor start push button 150 will cause a motor start relay 152 to energize through a normally closed stop push button 154 and a normally closed overload contact 156. Auxiliary motor start contact 158 will latch relay 152 after the start push button 150 is released and pilot light 160 will illuminate. Auxiliary motor start, contact 162 will provide power to pump motor 164 which will remain running until stop push button 154 is depressed or overload relay 166 detects an overload condition. In this example, start push button 150, stop push button 154, overload contact 156, auxiliary motor start contacts 158 and 162, and overload relay 166 are inputs to the programmable logic controller system. Relay 152, pilot light 160, and pump motor 164 are outputs. The PLC will have the registers containing the animation data for the inputs and outputs. An application program in the PLC will respond to the inputs to control the outputs.

A user at a remote location will browse the Internet for the home page of the installation of the programmable logic controller system. The PLC will have other control functions as well and if the user has the necessary authorizations, various options will become available. The home page will allow the user to acquire a snapshot of the PLC operations by allowing a view of various pages that will allow access to registers within the PLC. Other pages will also include displays of the PLC's configuration, remote and distributed I?O modules health statistics, display registers, back plane configuration, Ethernet statistics and others as shown previously in Table 1.

The mimic diagram page will be called up on a browser screen which will allow the user to view the status of the system. The mimic diagram's light 160, relay 152, contacts 158, 162, and pump motor 164 will be updated to correspond to the state of the actual devices. The states of the inputs and outputs will then be shown on the ladder diagram which will be automatically updated as they are changed. Through the use of applets representing the start 150 and stop 154 buttons, the user could manually control start and stopping of the motor by using a mouse or keyboard to position a cursor and "clicking" on either the start 168 or stop 170 boxes.

While the specific embodiments have been illustrated and described, numerous modifications are possible without departing from the scope or spirit of the invention.

I claim:

1. A device for maintaining determinism in a deterministic point to point computer network adapted for connection to a non-deterministic point to point computer network and adapted for connection to the deterministic point to point computer network, the device comprising:

a first port connection adapted for connection to the deterministic network for sending and receiving network messages on the deterministic network;

a second port connection adapted for connection to the non-deterministic network for sending and receiving network messages on the non-deterministic network;

a processor for sending the network messages received from the non-deterministic network through the second port connection to the deterministic network through the first port connection according to a predetermined cycle time for each message transmission, the cycle time based on a number of devices coupled to the network of industrial control devices, a bandwidth of the network of industrial control devices, and a predetermined load factor.

2. The system of claim 1 wherein the network is an Ethernet network.

3. The system of claim 2 wherein the non-deterministic port connection is attached to an Ethernet switch.

4. The system of claim 1 wherein the deterministic port connection is attached to an Ethernet switch.

5. A method of exchanging a message transmission between a target device on a network of industrial control devices and a source device on a general purpose communication network, the interface module comprising:

coupling the interface module to the general communications network;

coupling the interface module to the network of industrial control devices;

predetermining a cycle time for each message transmission, the cycle time based on a number of devices coupled to the network of industrial control devices, a bandwidth of the network of industrial control devices, and a predetermined load factor; and processing and delaying each message transmission such that the message transmissions are pre-configured and exchanged in a regular sequence, within the predetermined cycle time.

6. The method of claim 5 wherein the general purpose communication network is an Ethernet network.

7. The method of claim 6 wherein the interface module is coupled to an Ethernet switch of the general communications network.

8. The method of claim 5 wherein the interface module is coupled to an Ethernet switch of the network of industrial control devices.

9. The method of claim 8 further including means for calculating the time cycle such that total transmission quantity in unit time is deliberately limited to some fraction of a maximum transmission capability of the network.

10. The method of claim 8 wherein the network of industrial control devices is deterministic with a load factor limit of 10%.

11. The method of 8 claim wherein the calculating means delays the requests for data to a default limit of 3%.

* * * * *